(12) United States Patent
Fischer et al.

(10) Patent No.: US 10,546,021 B2
(45) Date of Patent: Jan. 28, 2020

(54) ADJACENCY STRUCTURES FOR EXECUTING GRAPH ALGORITHMS IN A RELATIONAL DATABASE

(71) Applicant: SAP SE, Walldorf (DE)

(72) Inventors: Thomas Fischer, Sandhausen (DE); Hinnerk Gildhoff, Heidelberg (DE); Romans Kasperovics, Heidelberg (DE); Cornelia Kinder, Walldorf (DE); Marcus Paradies, Walldorf (DE)

(73) Assignee: SAP SE, Walldorf (DE)

( * ) Notice: Subject to any disclaimer, the term of this patent is extended or adjusted under 35 U.S.C. 154(b) by 133 days.

(21) Appl. No.: 15/419,866

(22) Filed: Jan. 30, 2017

(65) Prior Publication Data
US 2018/0218088 A1     Aug. 2, 2018

(51) Int. Cl.
*G06F 16/901*  (2019.01)
(52) U.S. Cl.
CPC ................. *G06F 16/9024* (2019.01)
(58) Field of Classification Search
None
See application file for complete search history.

(56) References Cited

U.S. PATENT DOCUMENTS

| | | | |
|---|---|---|---|
| 7,599,947 B1 | 10/2009 | Tolbert et al. | |
| 2004/0044655 A1 | 3/2004 | Cotner et al. | |
| 2006/0004851 A1 | 1/2006 | Gold et al. | |
| 2006/0146754 A1* | 7/2006 | Bejerano | H04W 16/00 370/332 |
| 2006/0235812 A1* | 10/2006 | Rifkin | G06N 20/00 706/14 |
| 2008/0016038 A1 | 1/2008 | Moestl | |
| 2009/0319465 A1* | 12/2009 | Ignacio | G06N 5/02 706/50 |
| 2010/0306158 A1* | 12/2010 | Andersen | G06F 17/10 706/52 |
| 2010/0332436 A1* | 12/2010 | Yanagisawa | G06F 17/10 706/46 |
| 2011/0035403 A1* | 2/2011 | Ismalon | G06F 17/3064 707/769 |
| 2013/0212060 A1* | 8/2013 | Crouse | G06F 17/30563 707/602 |
| 2014/0163872 A1* | 6/2014 | Schilling | G01C 21/32 701/527 |
| 2014/0201234 A1 | 7/2014 | Lee et al. | |
| 2015/0135296 A1 | 5/2015 | Cason et al. | |
| 2015/0249669 A1 | 9/2015 | Gamage et al. | |
| 2015/0278396 A1* | 10/2015 | Vasilyeva | G06F 17/30958 707/769 |

(Continued)

*Primary Examiner* — Christopher J Raab
(74) *Attorney, Agent, or Firm* — Mintz Levin Cohn Ferris Glovsky and Popeo, P.C.

(57) ABSTRACT

A system for processing graph-modeled data in a relational database is provided. The system can include at least one data processor and at least one memory storing instructions that are executed by the at least one data processor. Executing the instructions can result in operations comprising: receiving a request to execute a graph algorithm operating on graph-modeled data stored at a relational database; and executing the graph algorithm within the relational database, the executing comprising use of an adjacency structure within the relational database. Related methods and articles of manufacture, including computer program products, are also provided.

17 Claims, 6 Drawing Sheets

(56) References Cited

U.S. PATENT DOCUMENTS

| | | |
|---|---|---|
| 2015/0281248 A1 | 10/2015 | Obbard |
| 2016/0342709 A1 | 11/2016 | Fokoue-Nkoutche et al. |
| 2017/0052952 A1 | 2/2017 | Alexander et al. |
| 2017/0053294 A1 | 2/2017 | Yang et al. |
| 2018/0203918 A1 | 7/2018 | Chen et al. |

* cited by examiner

ADJACENCY STRUCTURES FOR EXECUTING GRAPH ALGORITHMS IN A RELATIONAL DATABASE

TECHNICAL FIELD

The subject matter described herein relates to database management, and more particularly, to the processing of graph-modeled data in a relational database.

BACKGROUND

In a graph database, data is represented and stored using graph structures including, for example, vertices and edges. For instance, the vertices of a graph may correspond to the individual data items stored in a graph database while the edges of the graph may define the relationships between various data items. The vertices and the edges of the graph may be associated with various properties (e.g., weights, costs, distances, and/or the like) that further describe individual data items as well as the relationships between various data items. Thus, relationships between data items are stored explicitly (e.g., as edges and one or more corresponding properties) in a graph database.

By contrast, a relational database is configured to store relationships between data items implicitly. In a relational database, data is organized into tables (e.g., relations) that contain data items sharing one or more of the same attributes. Each data item in a table may be associated with a key. Here, a relationship between data items residing in different tables is implicitly defined by cross-referencing the respective keys of the data items. For example, one table may include the keys of related data items from another table, thereby linking data items from two different tables. Alternately and/or additionally, a relational database may provide tables for storing the keys of related data items from separate tables.

SUMMARY

In one aspect, a system may include at least one data processor and at least one memory. The at least one memory may store instructions that result in operations when executed by the at least one data processor. The operations may include: receiving a request to execute a graph algorithm operating on graph-modeled data stored at a relational database; and executing the graph algorithm within the relational database, the executing comprising use of an adjacency structure within the relational database.

In some variations, the adjacency structure may be an adjacency list and/or an adjacency matrix. The graph-modeled data may include a graph having a plurality of vertices and a plurality of edges, the plurality of vertices being stored in a vertex table and the plurality of edges being stored in an edge table. The adjacency structure may provide an indication that a first vertex from the plurality of vertices is adjacent to a second vertex from the plurality of vertices, the first vertex being adjacent to the second vertex by being connected to the second vertex by a first edge from the plurality of edges. The executing of the graph algorithm may include traversing, based at least on the adjacency structure, the graph.

In some variations, whether to generate the adjacency structure may be determined based at least on one or more performance metrics. The one or more performance metrics may include computational resources required for generating the adjacency structure, computational resources required for executing the graph algorithm with the adjacency structure, and/or computational resources required for executing the graph algorithm without the adjacency structure.

In some variations, the adjacency structure may be generated. The adjacency structure may be generated in response to the request to execute the graph algorithm.

In some variations, one or more changes in the graph-modeled data stored at the relational database may be detected and the adjacency structure may be updated based at least on the one or more change to the graph-modeled data. The adjacency structure may be stored at the relational database and may be used for executing the graph algorithm in response to another request to execute the graph algorithm.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
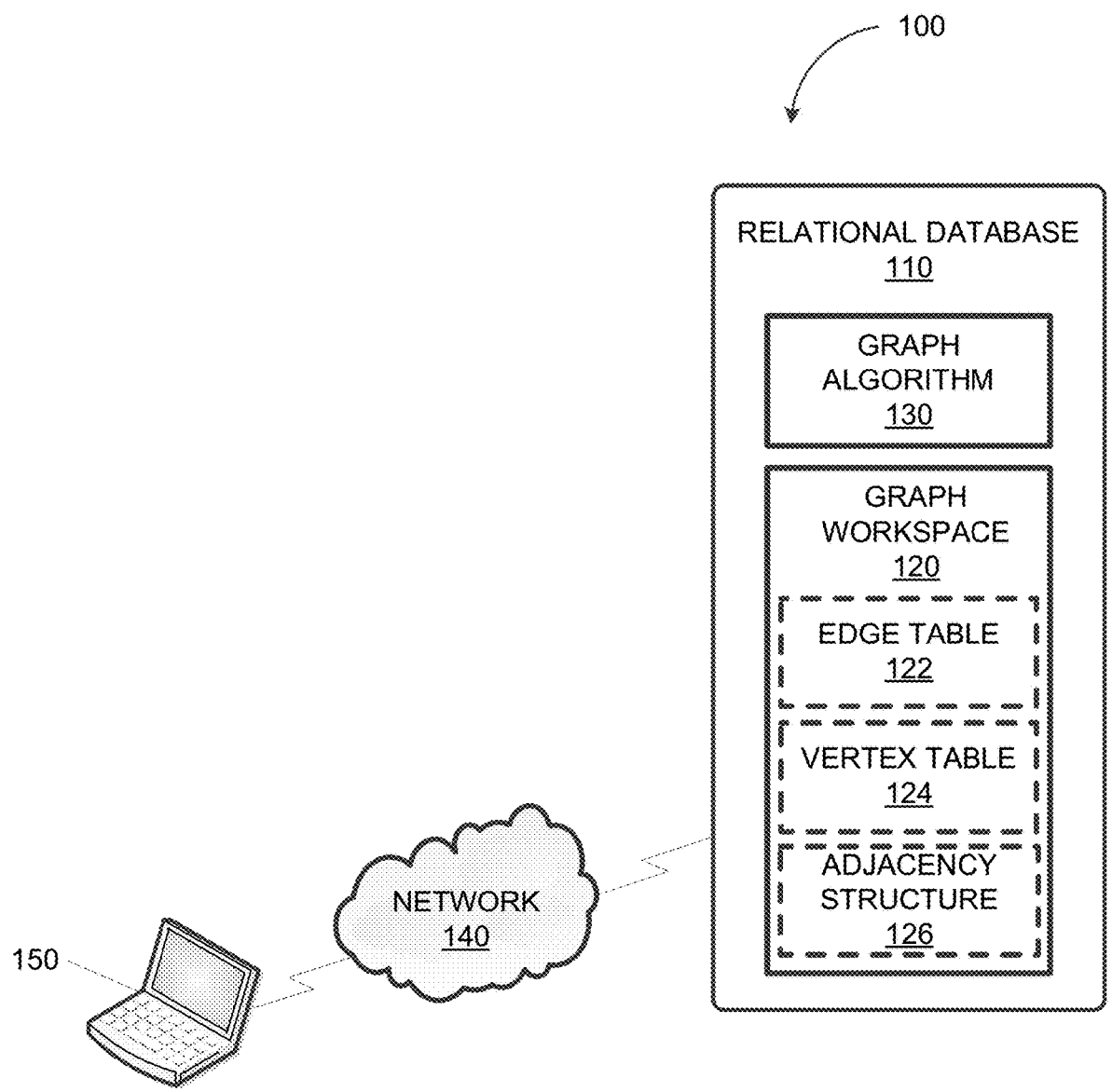
FIG. 1 depicts a block diagram illustrating a network environment consistent with some implementations of the current subject matter.

A relational database can be configured to store graph-modeled data. For example, the relational database may store the vertices and edges of a graph in different tables. The relational database can be further configured to provide native support of graph algorithms (e.g., shortest path, minimum flow, page rank, and/or the like) operating on the graph-modeled data such that graph algorithms can be performed within the relational database instead of by an external application or processing engine (e.g., a graph management system (GMS)). In order to expedite the execution of a graph algorithm within a relational database and/or the execution of a relational query, the relational database can generate a secondary index (e.g., an inverted index implemented as a binary tree) for the graph-modeled data and/or relational data. But a secondary index typically includes redundant data and is therefore an inefficient representation of the graph-modeled data.

Graph algorithms can exploit an adjacency data structure for efficient access to graph-modeled data such as, for example, identifying adjacent vertices for a given vertex. This adjacency structure may be an adjacency list and/or adjacency matrix enumerating a plurality of adjacent vertices in a graph, which are vertices connected via one or more edges in the graph. According to some implementations of the current subject matter, the adjacency structure may include redundant data and may therefore serve as a secondary index for the graph-modeled data stored in a relational database. Thus, a graph algorithm may be executed more efficiently based on the adjacency structure instead of primary data stored in the relational database. For instance, the graph algorithm may require traversal of a graph corresponding to at least a portion of the graph-modeled data stored at the relational database. The traversal of the graph may be performed based at least on the adjacency structure.

In some implementations of the current subject matter, an adjacency structure may be generated in response to a request to execute a graph algorithm at a relational database. For instance, an adjacency list and/or adjacency matrix may be generated when a shortest path, minimum flow, and/or page rank algorithm is to be executed at the relational database. According to some implementations of the current subject matter, an adjacency structure can be generated based on one or more performance metrics including, for example, the computational resources (e.g., time, processing, and/or memory) associated with executing a graph algorithm with and/or without adjacency structure. According to some implementations of the current subject matter, the relational database can implement one or more graph algorithms as a stored procedure at the relational database. That is, the relational database may store, based on the definition of a graph algorithm operating on the graph-modeled data stored at the relational database, the executable code corresponding to the graph algorithm at the relational database. Moreover, the relational database can generate and store a corresponding adjacency structure for the graph-modeled data. To maintain the currency of the adjacency structure, the adjacency structure can be updated and/or regenerated to reflect changes to the underlying graph-modeled data.

FIG. 1 depicts a block diagram illustrating a network environment 100 consistent with some implementations of the current subject matter. Referring to FIG. 1, the network environment 100 can include a relational database 110 that communicates with a plurality of client devices including, for example, a client device 150. As shown in FIG. 1, the relational database 110 can communicate with the client device 150 via a wired and/or wireless network 140, which can be a wide area network (WAN), a local area network (LAN), and/or the Internet. In some implementations of the current subject matter, the relational database 110 can be configured to store graph-modeled data. For instance, the relational database 110 can store graph-modeled data as a plurality of graph workspace objects including, for example, a graph workspace 120.

Figure 2:
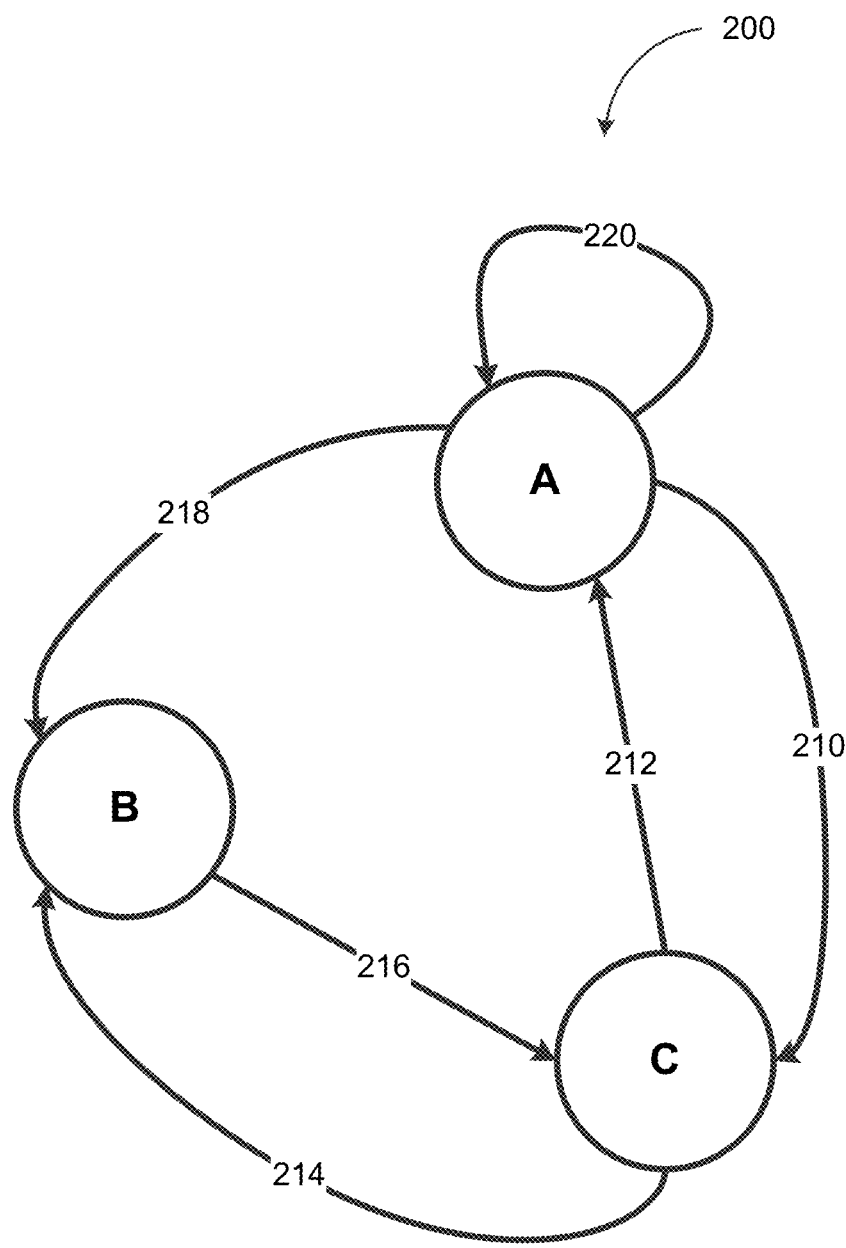
FIG. 2 depicts graph-modeled data consistent with some implementations of the current subject matter.

FIG. 2 depicts graph-modeled data 200 consistent with some implementations of the current subject matter. As shown in FIG. 2, the graph-modeled data 200 may include a plurality of vertices including, for example, a vertex A, a vertex B, and a vertex C. Each of the vertex A, the vertex B, and the vertex C may correspond to a data item. The vertex A, the vertex B, and/or the vertex C may also be associated with one or more properties that further describe the corresponding data item. Furthermore, the graph-modeled data 200 may include a plurality of edges including, for example, a first edge 210, a second edge 212, a third edge 214, a fourth edge 216, a fifth edge 218, and a sixth edge 220. Each of the first edge 210, the second edge 212, the third edge 214, the fourth edge 216, the fifth edge 218, and the sixth edge 220 may correspond to a relationship between the one or more vertices linked by the edge. The first edge 210, the second edge 212, the third edge 214, the fourth edge 216, the fifth edge 218, and/or the sixth edge 220 may also be associated with properties (e.g., weights, distances, costs, and/or the like) that further describe the relationships amongst the vertex A, the vertex B, and/or the vertex C.

It should be appreciated that in some implementations of the current subject matter, the relationship between two vertices can be directional. For instance, the first edge 210 and the second edge 212 can indicate a bidirectional relationship between the data items corresponding to the vertex A and the vertex C. By contrast, a single edge (e.g., the fifth edge 218) between the vertex A and the vertex B indicates that the data item corresponding to the vertex A is related to the data item corresponding to the vertex B but not vice versa. Moreover, a vertex can also have a relationship with itself. For example, the sixth edge 220 indicates that the data item corresponding to the vertex A is related to itself.

Referring to FIGS. 1-2, the graph workspace 120 may correspond to the graph-modeled data 200. As such, the graph workspace 120 can include an edge table 122 and a vertex table 124. The first edge 210, the second edge 212, the third edge 214, the fourth edge 216, and the fifth edge 218 as well as any corresponding properties associated with one or more of these edges can be stored in the edge table 122. Meanwhile, the vertex A, the vertex B, and the vertex C as well as any corresponding properties associated with one or more of these vertices can be stored in the vertex table 124.

In some implementations of the current subject matter, the relational database 110 can be configured to support the creation, execution, and/or export of one or more graph algorithms operating on the graph-modeled data (e.g., the graph workspace 120) stored at the relational database 110. For instance, a graph algorithm 130 (e.g., shortest path, minimum flow, page rank, and/or the like) operating on the graph workspace 120 can be implemented as a stored procedure such that executable code corresponding to the graph algorithm 130 is stored at the relational database 110. It should be appreciated that by providing native support for the graph algorithm 130, the creation, execution, and/or export (e.g., to another database) of the graph algorithm are required to conform to the rule enforced by the relational database 110. For instance, the relational database 110 may control, based on the privileges of a user with respect to the underlying graph-modeled data stored at the relational database 110, the ability of the user to create, execute, and/or export the graph algorithm 130.

In some implementations of the current subject matter, the relational database 110 can generate an adjacency structure 126 (e.g., an adjacency list and/or adjacency matrix) for the graph-modeled data stored at the relational database 110 (e.g., in the edge table 122 and the vertex table 124). The relational database 110 can generate the adjacency structure 126 based at least on the graph-modeled data. As such, the adjacency structure 126 can enumerate adjacent vertices (e.g., from the vertex table 124), which are connected via one or more edges (e.g., from the edge table 122). According to some implementations of the current subject matter, a user of the client device 150 can request to execute the graph algorithm 130, thereby causing the relational database 110 to generate the adjacency structure 126. The generating of the adjacency structure 126 can be further contingent upon one or more performance metrics including, for example, the computational resources (e.g., time, processing, and/or memory) required for generating the adjacency structure 126 and/or the computational resources required for executing the graph algorithm 130 with and/or without the adjacency structure 126. For example, the relational database 110 can generate the adjacency structure 126 when the computational resources required to execute the graph algorithm 130 without the adjacency structure 126 exceeds a threshold value, when the computational resources required to generate the adjacency structure 126 do not exceed a threshold value, and/or when a difference between the computational resources required to execute the graph algorithm 130 with and without the adjacency structure 126 exceeds a threshold value.

According to some implementations of the current subject matter, the graph algorithm 130 may be executed based at least on the adjacency structure 126. For instance, the graph algorithm 130 may require traversing a graph corresponding to the graph workspace 120 (e.g., the edge table 122 and/or the vertex table 124). This graph traversal may be performed based at least on the adjacent vertices enumerated in the adjacency structure 126. As shown in FIG. 1, the adjacency structure 126 can be included in the graph workspace 120. However, the adjacency structure 126 may be stored apart from the graph workspace 120 without departing from the scope of the present disclose. Furthermore, in some implementations of the current subject matter, the relational database 110 can generate the adjacency structure 126 dynamically (e.g., in response to a request from the user of the client device 150 to execute the graph algorithm 130), but the adjacency structure 126 is not persisted (e.g., for responding to subsequent requests to execute the graph algorithm 130).

Figure 3A:
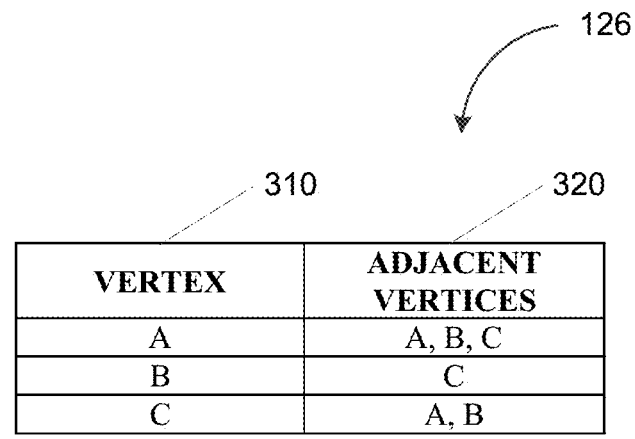
FIG. 3A depicts an adjacency structure consistent with some implementations of the current subject matter.

FIG. 3A depicts the adjacency structure 126 consistent with some implementations of the current subject matter. Referring to FIGS. 1-3A, the adjacency structure 126 can be implemented as an adjacency list that enumerates adjacent vertices from the graph-modeled data 200. For instance, the adjacency structure 126 can enumerate adjacent vertices by providing an indication of the vertices that are adjacent to one another. As shown in FIG. 3A, the adjacency structure 126 can be a table having a first column 310 and a second column 320. Each row in the first column 310 may store a vertex from the graph-modeled data 200 while the corresponding row in the second column 320 may store one or more adjacent vertices (e.g., vertices connected via one or more edges from the graph-modeled data 200). For example, the first column 310 may include a row storing the vertex A while the same row in the second column 320 may store the vertex B and the vertex C, which are adjacent to the vertex A because the vertex A is connected to the vertex B via the fifth edge 218 and to the vertex C via the first edge 210. It should be appreciated that adjacency structure 126 can reflect the directional relationship between the vertices. Thus, the vertex B is adjacent to vertex C but is not adjacent to vertex A because the fifth edge 218 indicates only a unilateral relationship from the vertex A to the vertex B.

Figure 3B:
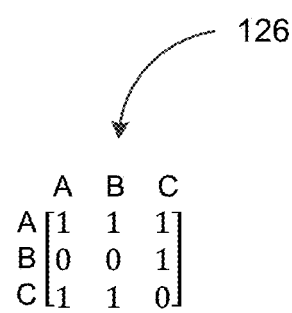
FIG. 3B depicts an adjacency structure consistent with some implementations of the current subject matter.

FIG. 3B depicts the adjacency structure 126 consistent with some implementations of the current subject matter. Referring to FIGS. 1-2 and 3B, the adjacency structure 126 can be implemented as an adjacency matrix that enumerates adjacent vertices from the graph-modeled data 200. In some implementations of the current subject matter, the adjacency structure 126 can be an n×n matrix, wherein n can correspond to a total number of vertices in the graph-modeled data 200. Each element $k_{i,j}$ from the adjacency structure 126 can correspond to whether an edge connects the corresponding vertex i to the vertex j such that the vertex i and the vertex j are adjacent vertices. As shown in FIG. 3B, to enumerate the adjacent vertices in the graph-modeled data 200, the adjacency structure 126 may be a 3×3 matrix. The element $k_{1,1}$ from the adjacency structure 126 may have a value (e.g., "1") indicating that the vertex A is connected to the vertex A (e.g., via the sixth edge 220). Meanwhile, the element $k_{2,1}$ from the adjacency structure 126 may have a value (e.g., "0") indicating that the vertex B is not connected to the vertex A.

Figure 4:
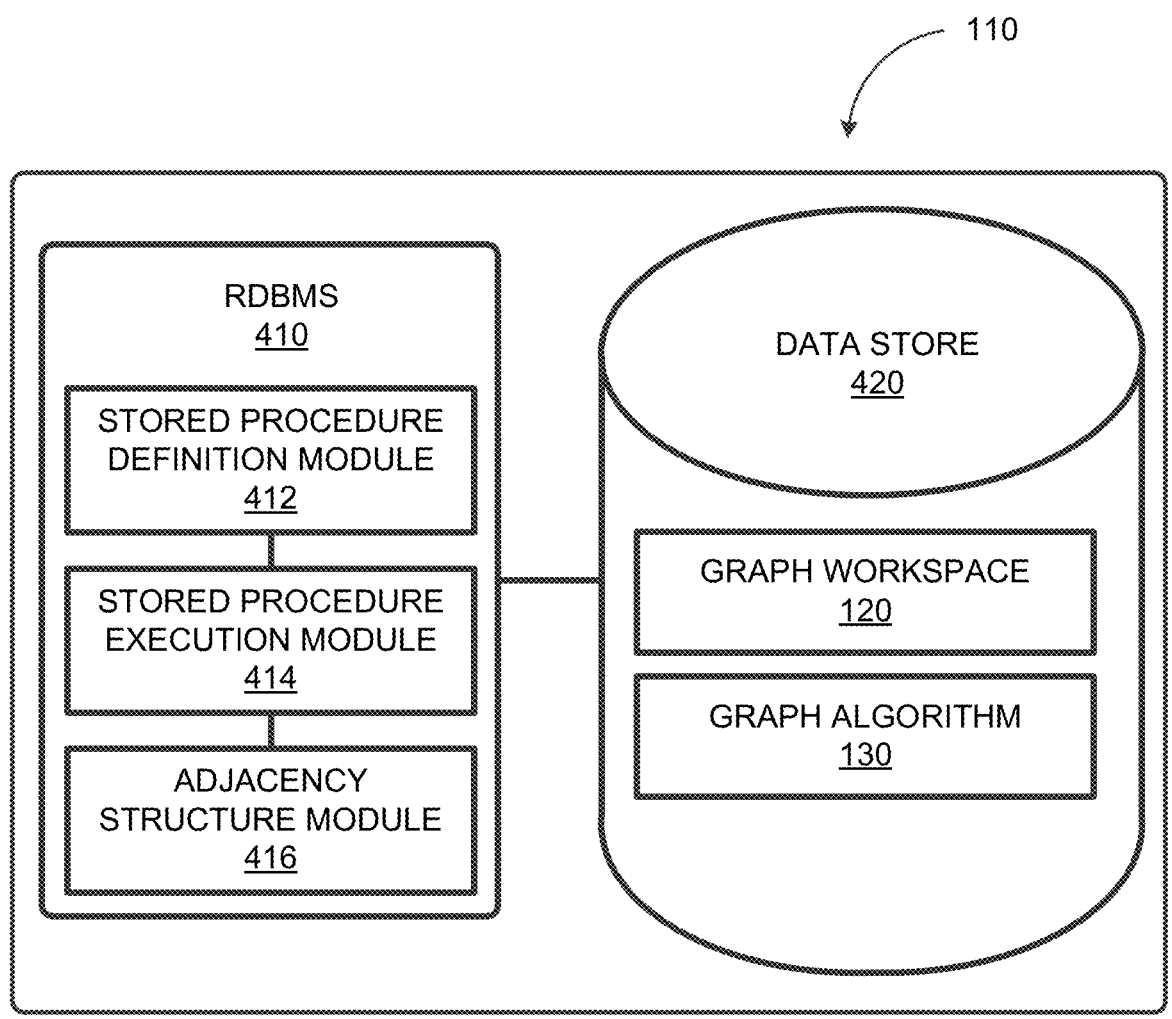
FIG. 4 depicts a block diagram illustrating a relational database consistent with implementations of the current subject matter.

FIG. 4 depicts a block diagram illustrating the relational database 110 consistent with implementations of the current subject matter. Referring to FIG. 4, the relational database 110 can include a relational database management system (RDBMS) 410 and one or more data stores 420.

As shown in FIG. 4, the data store 420 can be configured to store data including, for example, the graph workspace 120 and the graph algorithm 130. The graph workspace 130, as noted earlier, can include the edge table 122, the vertex table 124, and/or the adjacency structure 126. In some implementations of the current subject matter, the RDBMS 410 can be configured to enable the definition and/or execution of graph algorithms (e.g., the graph algorithm 130) operating on the graph workspace 120. Furthermore, the RDBMS 410 can generate one or more adjacency structures (e.g., the adjacency structure 126) that can be used in executing the graph algorithms. For instance, the RDBMS 410 can generate the adjacency structure 126 in response to a request to execute the graph algorithm 130. According to some example embodiments, the RDBMS 410 can generate the adjacency structure 126 based on one or more performance metrics including, for example, the computational resources (e.g., time, processing, and/or memory) required for generating the adjacency structure 126 and/or the computational resources required for executing the graph algorithm 130 with and/or without the adjacency structure 126.

Referring again to FIG. 4, the RDBMS 410 can include a plurality of modules including, for example, a stored procedure definition module 412, a stored procedure execution module 414, and an adjacency structure module 416. In some implementations of the current subject matter, the stored procedure definition module 412 can be configured to receive a definition for a stored procedure, which may be a graph algorithm expressed in a domain specific programming language (e.g., graph script) and operating on graph-modeled data stored in the data stores 220. For instance, the stored procedure definition module 412 can receive, from the user of the client device 150, one or more statements (e.g., SQL statements) that define the graph algorithm 130 operating on the graph workspace 120.

In some implementations of the current subject matter, the stored procedure definition module 412 can be configured to enforce one or more security rules. For example, the stored procedure definition module 412 can determine whether the user of the client device 150 has the privilege to define any graph algorithms operating on the graph workspace 120. According to some implementations of the currents subject matter, the user of the client device 150 may be allowed to define graph algorithms that operate on the graph workspace 120, when the user of the client device 150 is an owner of the graph workspace 120 and/or creator of the graph workspace 120. If the user of the client device 150 has the requisite privilege to define graph algorithms operating on the graph workspace 120, the stored procedure definition module 412 can enable the definition of the graph algorithm 130 by storing the executable code corresponding to the graph algorithm 130 (e.g., in the data store 220). Storing the executable code for the graph algorithm 130 enables the graph algorithm 130 to be invoked via one or more statements (e.g., SQL statements) to the RDBMS 410.

In some implementations of the current subject matter, the stored procedure execution module 414 can be configured to respond to requests to execute one or more stored procedures, which may be graph algorithms (e.g., the graph algorithm 130) operating on graph-modeled data stored in the data stores 220. For instance, the stored procedure execution module 414 can respond to requests from the user of the client device 150 to execute the graph algorithm 130, which operate on the graph workspace 120. The stored procedure execution module 414 can be configured to enforce one or more security rules. For example, the stored procedure execution module 414 can execute the graph algorithm 130 only when the requesting user has the requisite privilege to execute the graph algorithm 130, such as when the requesting user is the owner and/or creator of the graph workspace 120 and/or when requesting user has been granted execution privilege by the owner and/or creator of the graph workspace 120. According to some implementations of the current subject matter, the stored procedure execution module 414 can execute the graph algorithm 130 based at least on the adjacency structure 126.

In some implementations of the current subject matter, the adjacency structure module 416 can be configured to generate an adjacency structure that can be used in executing a graph algorithm. For example, the adjacency structure module 416 can generate the adjacency structure 126, which can be used in executing the graph algorithm 130. According to some implementations of the current subject matter, the adjacency structure module 416 can generate the adjacency structure 126 in response to a request (e.g., from the user of the client device 150) to execute the graph algorithm 130. The adjacency structure module 416 can further determine whether to generate the adjacency structure 126 based on one or more performance metrics including, for example, the computational resources (e.g., time, processing, and/or memory) required for generating the adjacency structure 126 and/or the computational resources required for executing the graph algorithm 130 with and/or without the adjacency structure 126. To illustrate, the adjacency structure module 416 can generate the adjacency structure 126 when the computational resources required to execute the graph algorithm 130 without the adjacency structure 126 exceeds a threshold value, when the computational resources required to generate the adjacency structure 126 does not exceed a threshold value, and/or when a difference between the computational resources required to execute the graph algorithm 130 with and without the adjacency structure 126 exceeds a threshold value.

Figure 5:
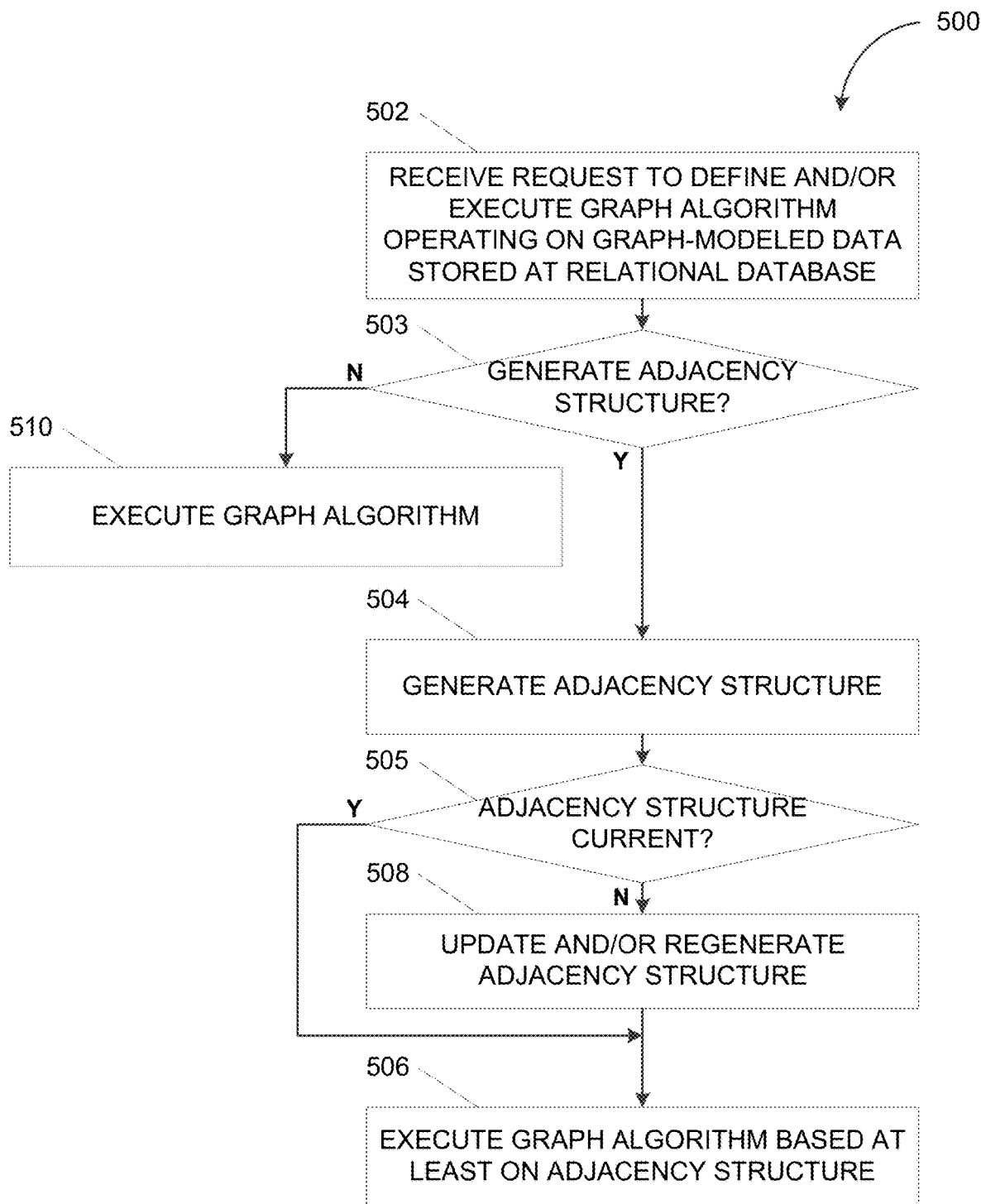
FIG. 5 depicts a flowchart illustrating a process for processing graph-modeled data in a relational database, in accordance with some example embodiments.

FIG. 5 depicts a flowchart illustrating a process 500 for processing graph-modeled data in a relational database consistent with implementations of the current subject matter. Referring to FIGS. 1-5, the process 500 can be performed by the relational database 110 (e.g., the RDBMS 410).

The relational database 110 can receive a request to execute a graph algorithm operating on graph-modeled data stored at the relational database 110 (502). For example, the relational database 110 can receive, from the user of the client device 150, a request to execute the graph algorithm 130, which operates on the graph workspace 120 stored at the relational database 110.

The relational database 110 can determine whether to generate the adjacency structure 126 for executing the graph algorithm (503). In some implementations of the current subject matter, the relational database 110 can determine to generate the adjacency structure 126 in response to the request to execute the graph algorithm 130. The relational database 110 can further determine whether to generate the adjacency structure 126 based on one or more performance metrics including, for example, the computational resources (e.g., time, processing, and/or memory) required for generating the adjacency structure 126 and/or the computational resources required for executing the graph algorithm 130 with and/or without the adjacency structure 126.

The relational database 110 can determine to generate the adjacency structure 126 for executing the graph algorithm (503-Y). For instance, the relational database 110 can determine to generate the adjacency structure 126 in response to the request to execute the graph algorithm 130. Alternately and/or additionally, the relational database 110 can determine to generate the adjacency structure 126 when the computational resources required to execute the graph algorithm 130 without the adjacency structure 126 exceeds a threshold value, when the computational resources required to generate the adjacency structure 126 does not exceed a threshold value, and/or when a difference between the computational resources required to execute the graph algorithm 130 with and without the adjacency structure 126 exceeds a threshold value.

When the relational database 110 determines to generate an adjacency structure 126 for executing the graph algorithm, the relational database 110 can generate the adjacency structure (504). For example, the relational database 110 can generate, based on the graph-modeled data corresponding to the graph workspace 120 (e.g., the edge table 122 and the vertex table 124), an adjacency list and/or an adjacency matrix that enumerates adjacent vertices in the graph-modeled data. The adjacency structure 126 can be used when the graph algorithm 130 is executed on the graph-modeled data corresponding to the graph workspace 120.

In some implementations of the current subject matter, the relational database 110 can continuously, periodically, and/or dynamically update the adjacency structure 126 such that the adjacency structure 126 is synchronized to the underlying graph-modeled data. Thus, the relational database 110 can determine whether the adjacency structure 126 is current (505). For instance, the relational database 110 can determine whether one or more changes have been made to the graph workspace 120 since the adjacency structure 126 was last generated (e.g., at operation 504). If the relational database 110 determines that the adjacency structure is current (505-Y), the relational database 110 can execute the graph algorithm based at least on the adjacency structure (506). But if the relational database 110 determines that the adjacency structure is not current (505-N), the relational database 110 can update and/or regenerate the adjacency structure (508) before executing the graph algorithm based on the adjacency structure (506). For instance, when the graph workspace 120 has undergone one or more changes since the adjacency structure 126 was last generated, the relational database 110 can update and/or regenerate the adjacency structure 126 based at least on the one or more changes to the graph workspace 120. The adjacency structure 126 may be updated prior to executing the graph algorithm 130 based on the adjacency structure 126.

Alternately and/or additionally, the relational database 110 can determine not to generate the adjacency structure 126 for executing the graph algorithm (503-N). As such, the relational database 110 can execute the graph algorithm (510). For instance, the relational database 110 can determine to not generate the adjacency structure 126 when the computational resources required to execute the graph algorithm 130 without the adjacency structure 126 does not exceed a threshold value, when the computational resources required to generate the adjacency structure 126 exceeds a threshold value, and/or when a difference between the computational resources required to execute the graph algorithm 130 with and without the adjacency structure 126 do not exceed a threshold value. In this scenario, the relational database 110 can execute the graph algorithm 130 without relying on the adjacency structure 126. Instead, the relational database 110 may execute the graph algorithm 130 based on the underlying graph-modeled data from the edge table 122 and/or the vertex table 124.

In some implementations of the current subject matter, whether to generate the adjacency structure 126 may be based on a plurality of factors including, for example, frequency and/or extent of modifications and/or memory constraints. As such, there may be instances where the relational database 110 determines to not generate the adjacency structure 126 such as when memory is limited and/or when the cost of updating the adjacency structure 126 is excessive due to frequency and/or extensive modifications. Alternately and/or additionally, whether to generate the adjacency structure 126 can be a user configurable option.

Figure 6:
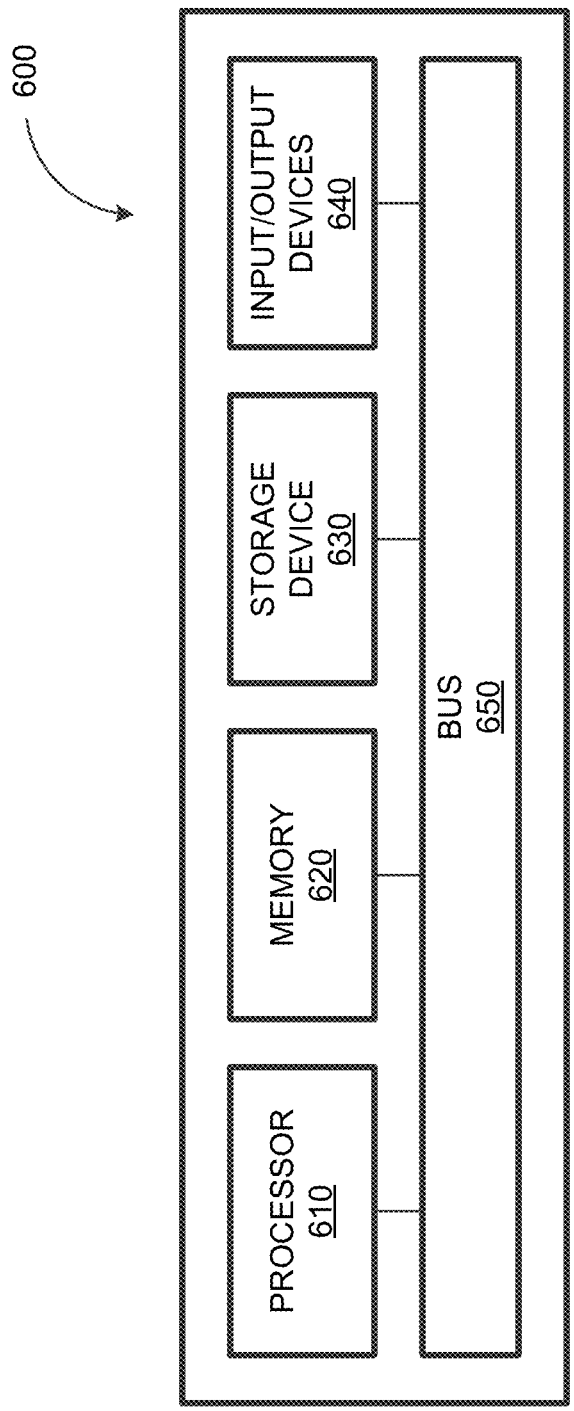
FIG. 6 depicts a block diagram illustrating a computing system consistent with some implementations of the current subject matter.

FIG. 6 depicts a block diagram illustrating a computing system 600 consistent with some implementations of the current subject matter. Referring to FIGS. 1 and 5, the computing system 600 can be used to implement the RDBMS 410 and/or any components therein.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the RDBMS 410. In some implementations of the current subject matter, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, or a tape device, or other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces.

According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some implementations of the current subject matter, the computing system 600 can be used to execute various interactive computer software applications that can be used for organization, analysis and/or storage of data in various (e.g., tabular) format (e.g., Microsoft Excel®, and/or any other type of software). Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system, comprising:
   at least one data processor; and
   at least one memory storing instructions which, when executed by the at least one data processor, result in operations comprising:
   receiving a request to execute a graph algorithm operating on graph-modeled data stored at a relational database;
   determining, based at least on a first computational resource required to execute the graph algorithm with an adjacency structure, a second computational resource required to execute the graph algorithm without the adjacency structure, and a third computational resource required for generating the adjacency structure, the adjacency structured being generated based at least on the second computational resource exceeding a first threshold value, the third computational resource not exceeding a second threshold value, and a difference between the first computational resource and the second computational resource exceeding a third threshold value; and
   executing, based at least on the adjacency structure, the graph algorithm within the relational database.

2. The system of claim 1, wherein the adjacency structure comprises an adjacency list and/or an adjacency matrix.

3. The system of claim 1, wherein the graph-modeled data includes a graph having a plurality of vertices and a plurality of edges, the plurality of vertices being stored in a vertex table and the plurality of edges being stored in an edge table.

4. The system of claim 3, wherein the adjacency structure provides an indication that a first vertex from the plurality of vertices is adjacent to a second vertex from the plurality of vertices, the first vertex being adjacent to the second vertex by being connected to the second vertex by a first edge from the plurality of edges.

5. The system of claim 3, wherein the executing of the graph algorithm comprises traversing, based at least on the adjacency structure, the graph.

6. The system of claim 1, further comprising:
   generating the adjacency structure.

7. The system of claim 6, wherein the adjacency structure is generated in response to the request to execute the graph algorithm.

8. The system of claim 1, further comprising:
   detecting one or more changes in the graph-modeled data stored at the relational database; and
   updating, based at least on the one or more change to the graph-modeled data, the adjacency structure.

9. The system of claim 1, wherein the adjacency structure is stored at the relational database and is used for executing the graph algorithm in response to another request to execute the graph algorithm.

10. A computer-implemented method, comprising:
receiving a request to execute a graph algorithm operating on graph-modeled data stored at a relational database;
determining, based at least on a first computational resource required to execute the graph algorithm with an adjacency structure, a second computational resource required to execute the graph algorithm without the adjacency structure, and a third computational resource required for generating the adjacency structure, the adjacency structured being generated based at least on the second computational resource exceeding a first threshold value, the third computational resource not exceeding a second threshold value, and a difference between the first computational resource and the second computational resource exceeding a third threshold value; and
executing, based at least on the adjacency structure, the graph algorithm within the relational database.

11. The method of claim 10, wherein the adjacency structure comprises an adjacency list and/or an adjacency matrix.

12. The method of claim 10, wherein the graph-modeled data includes a graph having a plurality of vertices and a plurality of edges, the plurality of vertices being stored in a vertex table and the plurality of edges being stored in an edge table.

13. The method of claim 12, wherein the adjacency structure provides an indication that a first vertex from the plurality of vertices is adjacent to a second vertex from the plurality of vertices, the first vertex being adjacent to the second vertex by being connected to the second vertex by a first edge from the plurality of edges.

14. The method of claim 12, wherein the executing of the graph algorithm comprises traversing, based at least on the adjacency structure, the graph.

15. The method of claim 10, further comprising:
generating the adjacency structure.

16. The method of claim 10, further comprising:
detecting one or more changes in the graph-modeled data stored at the relational database; and
updating, based at least on the one or more change to the graph-modeled data, the adjacency structure.

17. A non-transitory computer-readable storage medium including program code, which when executed by at least one data processor, cause operations comprising:
receiving a request to execute a graph algorithm operating on graph-modeled data stored at a relational database;
determining, based at least on a first computational resource required to execute the graph algorithm with an adjacency structure, a second computational resource required to execute the graph algorithm without the adjacency structure, and a third computational resource required for generating the adjacency structure, the adjacency structured being generated based at least on the second computational resource exceeding a first threshold value, the third computational resource not exceeding a second threshold value, and a difference between the first computational resource and the second computational resource exceeding a third threshold value; and
executing, based at least on the adjacency structure, the graph algorithm within the relational database.

* * * * *